C. AHLSWEDE.
TRACTION DEVICE FOR AUTOMOBILES.
APPLICATION FILED APR. 19, 1919.
1,317,673.
Patented Oct. 7, 1919.
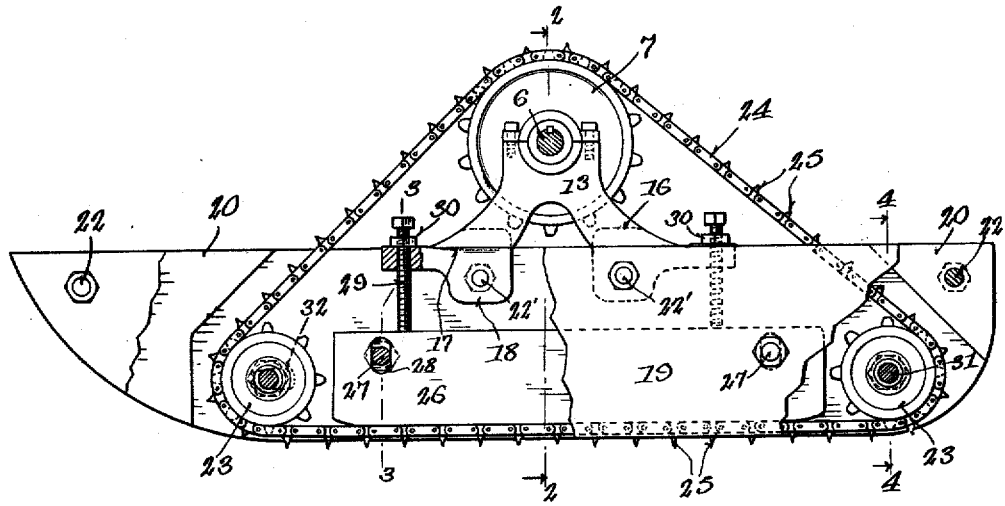
INVENTOR
Charles Ahlswede
BY
Morrell & Keeney
ATTORNEY

UNITED STATES PATENT OFFICE.

CHARLES AHLSWEDE, OF MANITOWOC, WISCONSIN.

TRACTION DEVICE FOR AUTOMOBILES.

1,317,673.  Specification of Letters Patent.  Patented Oct. 7, 1919.

Application filed April 19, 1919. Serial No. 291,269.

*To all whom it may concern:*

Be it known that I, CHARLES AHLSWEDE, a citizen of the United States, and resident of Manitowoc, in the county of Manitowoc and State of Wisconsin, have invented new and useful Improvements in Traction Devices for Automobiles, of which the following is a description, reference being had to the accompanying drawings, which are a part of this specification.

The present invention relates to certain new and useful improvements in traction devices for automobiles. It has for its primary object the provision of a runner readily attachable to an automobile to adapt the same for use on ice, etc.

A further object of this invention is to provide a runner, having means for adjusting the traction drive means which is of caterpillar type.

With the above and other objects in view, which will appear as the description proceeds, the present invention resides in the novel construction, combination and arrangement of parts substantially as hereinafter described and claimed, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, in which:

Figure 1 is a side elevation view with parts broken away and in section to more clearly illustrate details of construction;

Fig. 2 is a sectional view taken on the line 2—2 of Fig. 1;

Fig. 3 is a sectional view taken through the runner on the line 3—3 of Fig. 1; and Fig. 4 is a sectional view through the runner taken on the line 4—4 of Fig. 1.

Referring now more particularly to the drawing, 5 designates the rear differential housing of an automobile, having journaled therein a drive shaft 6, one end of which is extended outwardly thereof and has keyed thereon a drive wheel or sprocket 7 retained in place by means of lock nuts 8. Carried by the drive wheel 7 is a brake drum 9 of conventional construction, which coöperates with suitable brake mechanisms 10 carried by the housing 5.

The drive wheel 7 has formed integral therewith a laterally projecting hub member 11, threaded at its outer end to receive a hub cap 12 and providing on its intermediate portion a bearing for the arm 13 of the bracket 14, the other arm 15 of the bracket being journaled about the housing 5. The bracket 14 is provided with the downwardly and outwardly projecting members 16 which are shouldered as at 17 to provide reduced portions 18 adapted to be secured to the runner.

The runner is constructed of two like longitudinal plates 19, spaced apart by means of fillers 20 and reduced portions 18 to provide an intermediate recess 21, the plates being held in position by bolts 22 and 22'. The bolts 22' also serve to secure the runner proper to the bracket 14.

Journaled in the recess 21, near each end thereof, is a sprocket or guide wheel 23 and trained around the guide wheels 23 and the drive wheel 7 is a traction chain or the like 24, provided with a series of teeth 25, the said teeth being adapted to project below the lower edge of the plates 19 to grip the ground over which the runner is traveling. For retaining the traction means in engagement with the ground, an elongated plate 26 is provided which serves as a support for the portion of the traction means intermediate the two guide wheels 23, and this plate 26 is adjustably secured in the recess 21 by means of bolts 27 passing through the elongated openings 28 of the plate, the proper adjustment of the plate being had by screw bolts 29 engaging the top of the plate, the bolts 29 being engaged in the members 16 of the bracket 14 and being provided with lock nuts 30 for locking the same in adjustment.

From the foregoing description, it will be be readily seen that to equip an automobile with my device it is simply necessary to remove the automobile wheel and secure the drive sprocket 7 to the drive axle in place thereon, and that the traction chain 25 may be adjusted to increase or decrease its traction power and that any slack in the traction chain may be compensated for by means of its pivot 31 which may be moved in the elongated opening 32 and locked in position by its lock nuts 33. It will also be seen that lateral movement of the bracket is prevented by means of the arm 13 which is confined on the hub 11 by means of a hub cap 12 and the shoulder 12' on the drive gear 7.

What I claim as my invention is:

1. The combination, with a driving axle, of a runner comprising a pair of spaced plates, a bracket supported by the drive axle, one end portion of the bracket having its opposite sides shouldered to provide a spacing tongue, said tongue being projected between and secured to the plates of said runner, a guide carried by the runner, a drive member on the axle, and a traction means trained around said guide and drive member.

2. The combination, with an axle housing and an axle located therein, one end of said axle being extended beyond the adjacent end of the housing, of a drive wheel fixed to the projecting end of the axle, a bracket including a bearing disposed around said end of the axle, a runner carried by the bracket, a traction means carried by the runner and connected with said drive wheel, and means adjustable from said bracket for urging said traction means to engage with the road's surface.

3. The combination, with an axle housing and an axle located thereon, one end of said axle being extended beyond the adjacent end of the housing, of a drive wheel fixed to the projecting end of the axle, a one-piece bracket including a pair of spaced arms, the ends of one of the arms being journaled on said axle housing, the end of the other arm having a bearing receiving the projecting end of the axle, said drive wheel being disposed between said arms, a runner secured to the bracket at the junction of said arms, and a traction means carried by the runner and connected with said drive wheel.

4. The combination, with a driving axle, of a runner comprising a pair of spaced plates, a bracket supported by the driving axle, one end of the bracket having its opposite sides shouldered to provide a spacing tongue, said tongue being projected between and secured to the plates of the runner, a guide carried by the runner, a drive member on the axle, a traction means trained around said guide and drive member, an elongated plate disposed in the recess between said plates and the guides therein, and adjusting means carried by the shoulders of said bracket and engaging said plate to adjust the engagement of the same with said traction means.

5. A device of the class described comprising a runner having an elongated recess opening through its bottom, spaced apart guides mounted in said recess, a traction member trained around said guides and a driven member, a tensioning member disposed in said elongated recess between said guides and engaged with said traction member, and screw means for varying the distance between said tensioning member and the bottom of the runner to adjust the traction power of the traction member.

6. A device of the class described comprising a runner, a bracket member carried thereby, means carried by the bracket member for connecting the same with a vehicle, a traction member carried by the runner, means for transmitting power to said traction member, and means for adjusting the traction power of said traction member and including a vertical adjustable member carried by said runner adjacent its ground engaging portion, said adjustable member being engageable with said traction member to retain the same in engagement with the ground's surface, and jack screws carried by said bracket member and engageable with said adjustable member.

7. A device of the class described comprising a runner, traction means carried thereby, means for transmitting power to the traction means, and a bracket member for connecting the runner with a vehicle, said bracket member including a pair of downwardly and outwardly projecting arms connected to said runner, and a pair of upwardly extending spaced apart arms adapted to be pivotally connected with the vehicle axle.

In testimony whereof I affix my signature.

CHARLES AHLSWEDE.